US008240078B2

(12) United States Patent
Hawryshyn et al.

(10) Patent No.: US 8,240,078 B2
(45) Date of Patent: Aug. 14, 2012

(54) ARTIFICIAL FISHING LURE THAT GENERATES VISUAL AND AUDIBLE SIGNALS

(76) Inventors: Craig W. Hawryshyn, Kingston (CA); Steven R. Shaw, Bazeman, MT (US); Gregory J. Mitchell, Norwich, CT (US); Glenn E. McDonald, Marston Mills, MA (US); Richard R. Fay, Chicago, IL (US)

( * ) Notice: Subject to any disclaimer, the term of this patent is extended or adjusted under 35 U.S.C. 154(b) by 944 days.

(21) Appl. No.: 12/126,685

(22) Filed: May 23, 2008

(65) Prior Publication Data

US 2008/0289241 A1 Nov. 27, 2008

Related U.S. Application Data

(60) Provisional application No. 60/931,684, filed on May 24, 2007, provisional application No. 61/034,678, filed on Mar. 7, 2008.

(51) Int. Cl.
*A01K 75/02* (2006.01)
(52) U.S. Cl. ....................................................... 43/17.6
(58) Field of Classification Search .................. 43/17.6; 362/253
See application file for complete search history.

(56) References Cited

U.S. PATENT DOCUMENTS

| 1,393,617 | A | | 10/1921 | Frame | 43/26.2 |
|---|---|---|---|---|---|
| 2,797,519 | A | | 7/1957 | Keller | 43/42.06 |
| 4,203,246 | A | | 5/1980 | Sacharnoski, Sr. | 43/43.31 |
| 4,888,905 | A | | 12/1989 | Garr | 43/17.6 |
| 5,231,781 | A | * | 8/1993 | Dunbar | 43/17.5 |
| 6,807,766 | B1 | | 10/2004 | Hughes et al. | 43/17.6 |
| 6,922,935 | B2 | | 8/2005 | Yu | 43/17.6 |
| 7,607,798 | B2 | * | 10/2009 | Panotopoulos | 362/233 |
| 7,819,554 | B2 | * | 10/2010 | Leung et al. | 362/253 |
| 7,825,354 | B2 | * | 11/2010 | Flagle | 219/497 |
| 2003/0182841 | A1 | * | 10/2003 | Calak et al. | 43/17.6 |
| 2006/0174537 | A1 | * | 8/2006 | Woodham et al. | 43/44.99 |

* cited by examiner

*Primary Examiner* — Christopher P Ellis
(74) *Attorney, Agent, or Firm* — Sofer & Haroun, LLP

(57) ABSTRACT

A fishing lure that contains electronics and provides the lure with characteristics that better attract fish. The fishing lure has a body with external flank surfaces. A plurality of light sources are contained within the lure. The light sources shine light out from the flank surfaces of the lure when activated. A light sensor in the lure detects ambient light levels outside of the lure. The light levels detected by the light sensor are used to control the output intensity of the light sources as they activate. In addition to internal light sources, the fishing lure may also contain a transducer for creating acoustical particle motion in the water. Both the light sources and the transducer are controlled in a unique manner that causes the lure to closely mimic the visual and acoustical properties of a live baitfish.

11 Claims, 2 Drawing Sheets

ARTIFICIAL FISHING LURE THAT GENERATES VISUAL AND AUDIBLE SIGNALS

RELATED APPLICATIONS

This application claims the priority of U.S. Provisional Application No. 60/931,684; filed May 24, 2007, entitled Fishing Lure Assembly.

This application also claims the priority of U.S. Provisional Patent Application No. 61/034,678, filed Mar. 7, 2008, entitled Light Emission From Lure.

BACKGROUND OF THE INVENTION

1. Field of the Invention

In general, the present invention relates to fishing lures. More particularly, the present invention relates to fishing lures that contain electronic circuitry that provide the lure with characteristics that attract fish.

2. Prior Art Description

The activity of fishing with a baited line predates recorded history. In this vast period of time, inventive fishermen have developed countless baits and lures. In the past several decades, the popularity of recreational sport fishing has grown dramatically. In light of this popularity, fishermen have been inclined to develop new instruments and techniques for finding and catching fish. It is for this reason that the prior art record of patents is replete with thousands of different fishing lure designs.

Many artificial lures are designed with shapes and color schemes that mimic real baitfish. However, many species of fish track their prey using identifiers other than size, shape and color. Three of those identifiers are scent, light reflection characteristics and the pressure waves made by baitfish swimming through the water.

Many fish have scales and other anatomical features that reflect different frequencies of light. As a fish swims, the light passing through the water from above strikes the fish at different angles. Some frequencies of the impinging light are absorbed by the scales of the fish. Some frequencies of light are absorbed by the water. However, some frequencies of light reach a swimming fish and reflect off the fish. Consequently, in nature, when a predator fish is following a prey fish, the predator fish will see random flashes of light that are created by light reflecting off the swimming prey fish. The frequency of the light contained in those flashes and the duration of such flashes depend largely upon the anatomical features, pigmentation, depth and orientation of prey fish in the water.

Some prior art lures contain internal lights. These lures are intended to make the lure more visible in murky water or very deep water. However, lures with lights that are too bright are more likely to scare fish away than to attract fish. Such prior art fishing lures are exemplified by U.S. Pat. No. 4,888,905 to Garr, entitled Enhanced Light Fishing Lure.

Some internally illuminated fishing lures also contain control circuits that flash internal lights or change the color of the internal lights. Such prior art lures are exemplified by U.S. Pat. No. 6,922,935 to Yu, entitled Light Emitting Fishing Lure. However, the output of the lights is unregulated. Accordingly, in bright sunlight, the lure may flash too dimly to attract fish. In low-light conditions, the lure may flash too brightly and may startle away fish.

It will be further understood that as a prey fish swims through the water, the prey fish creates various pressure waves that travel through the water. Some predator fish are highly sensitive to such pressure waves and can isolate abnormal pressure waves that may be created by an injured fish.

Prior art lures have been designed that generate pressure waves to attract fish. Some prior art lures have simple mechanical components that move and generate noise as the lure moves through the water. Such prior art lures are exemplified by U.S. Pat. No. 4,203,246 to Sacharnoski, entitled Fishing Lure Sound Producer. More sophisticated lures contain electronic circuitry that produces sounds. Such prior art lures are exemplified by U.S. Pat. No. 6,807,766 to Hughes, entitled Electronic Programmable Fishing Lure. However, in such prior art lures, the sound being generated is the same at each interval. This repeating beacon approach has been shown to repel certain fish that might otherwise be attracted to the lure.

It is also well known that many fish either find or track prey fish based on the scent of the prey fish. In fact, some species of fish are so sensitive to scent that they can detect prey miles away and well out of visual range.

Most fish species are known to have the ability to detect chemicals in the environment. It has been determined that certain compounds, such as amino acids, specific proteins, lipids, citrates, urea and other compounds, are contained within the tissues, excretions or blood of prey fish. These compounds, either individually or in combination can physiologically stimulate the olfactory and or gustatory receptors when detected by predator fish. These observed changes in certain predator fish include, increased instances of snapping, biting, and swallowing, as well as increased retention time of held bait. Some fish have been observed to swim more aggressively and across wider areas when scent compounds are detected in the water.

It is for these reasons that natural baits have long been used by fishermen in an attempt to present a natural food source to fish. It is also for these reasons that fishermen chum the waters where they are fishing in hopes of attracting predator game fish. Natural baits however, have a number of inherent drawbacks and disadvantages. These shortcomings include rapid bacteriological spoilage, high cost, unpleasant handling, and durability issues resulting in one time only use. Natural bait also smells, and fouls all surfaces it touches. This requires that fishing boats and fishing gear be cleaned repeatedly in order to be kept sanitary. Recognizing the disadvantages of natural bait, the popularity of artificial lures has grown.

Although artificial lures solved many of the obvious shortcomings of natural bait, they were not as effective in catching fish, as is natural bait. The prior art is replete with many different lure designs that incorporate scent or other perceived methods to attract predator game fish to artificial lures. In the simplest form, such prior art lures use an absorbent material that is soaked with fish oils. Such prior art lures are exemplified by U.S. Pat. No. 1,393,617 to Frame, entitled Artificial Bait; and U.S. Pat. No. 2,797,519 to Keller, entitled Artificial Bait.

A problem associated with absorbent fishing lures is that they have a tendency to release their scent quickly. Thus, after the lure has been in use in the water for only a few minutes, all the oils have left the lure and the lure is saturated with only water.

A larger problem associated with absorbent fishing lures is that the material that absorbs the scented oil occupies a large percentage of the lure. The larger the volume of scented oil, the longer the lure is capable of releasing scent. Little room is left for other elements, such as electronics for producing light and/or sound.

A need therefore exists for an improved fishing lure assembly that can generate light in a manner that is governed by the intensity of ambient light, so as to produce more realistic simulations of reflection flashes from prey fish. A need also exists for an improved fishing lure assembly that can generate pressure waves that are not repetitive or recorded, so as to produce more realistic simulations of pressure waves from prey fish. Lastly, a need exists for an improved fishing lure, capable of holding the electronic components needed to create light flashes and sound waves, while still being able to release scent over a prolonged period of time. These needs are met by the present invention as described and claimed below.

SUMMARY OF THE INVENTION

The present invention is a fishing lure that contains electronics to provide the lure with characteristics that better attract fish. The fishing lure has a body with external flank surfaces. A plurality of light sources are contained within the lure. The light sources shine light out from the flank surfaces of the lure when activated. A light sensor in the lure detects ambient light levels outside of the lure. The light levels detected by the light sensor are used to control the output intensity of the light sources as they activate.

In addition to internal light sources, the fishing lure may also contain a transducer for creating acoustical particle motion in the water. Both the light sources and the transducer are controlled in a unique manner that causes the lure to closely mimic the visual and acoustical properties of a live baitfish.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION OF THE DRAWINGS

Figure 1:
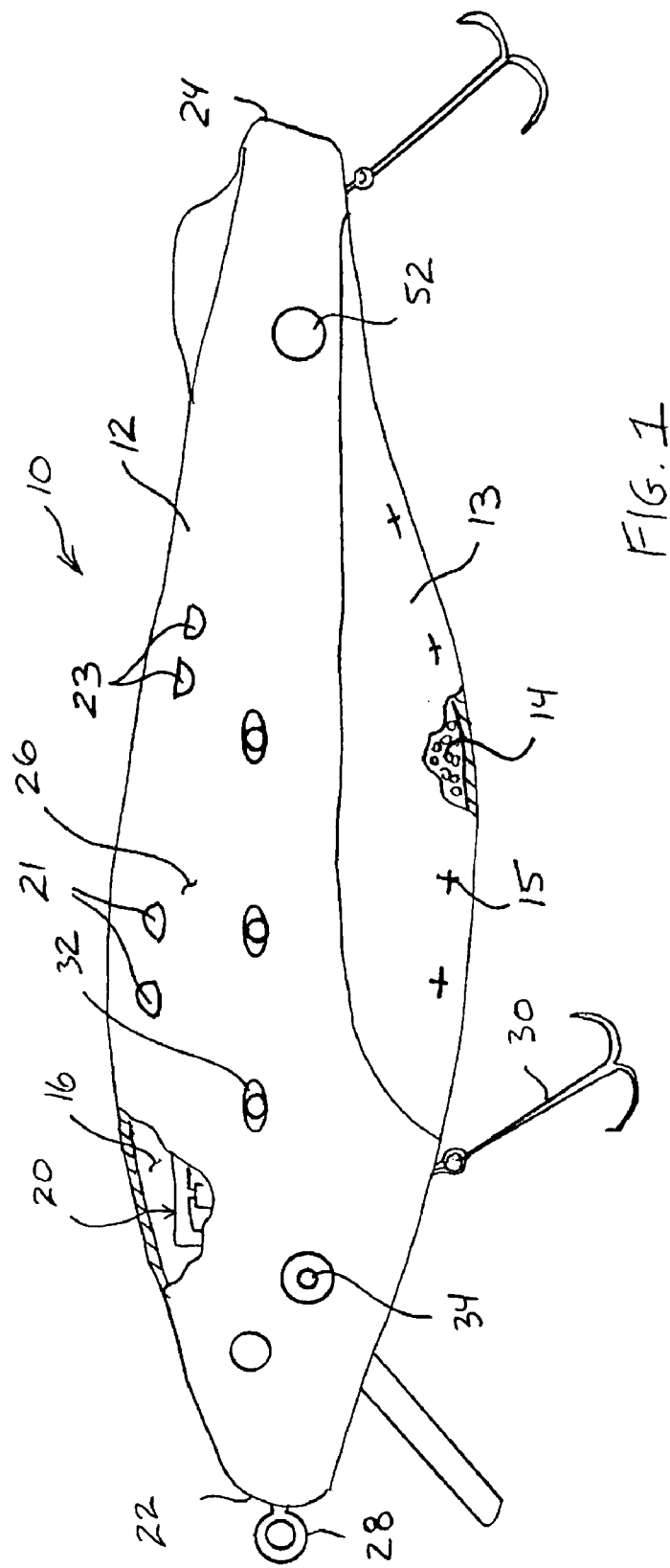
FIG. 1 is a perspective view of an exemplary embodiment of a fishing lure.

Referring to FIG. 1, an exemplary embodiment of a fishing lure 10 is shown. It will be understood that the size and shape of a fishing lure can vary widely depending upon the waters being fished and the type of fish being sought. The shown embodiment of a fishing lure 10 is meant to be indicative of all lures, regardless of shape and size.

The fishing lure 10 has a body 12. The body 12 of the fishing lure 10 defines an internal chamber that is filled with a slow release, scented material 14. The scented material 14 slowly releases scented oil into the water when the fishing lure 10 is submersed.

The body 12 may also contain a belly section 13 that is made of an elastomeric material. The elastomeric belly section 13 is filled with a scented composition. Slits 15, or similar openings, are formed through elastomeric material of the belly section 13. The slits 15 stay closed and release only very small amounts of the scented material into the surrounding water. However, when a fish bites the lure 10, the belly section 13 deforms. This causes the slits 15 to open and a gush of scented material to be released.

Consequently, by having a soft belly section 13, the lure feels soft and more natural to a fish's bite. Likewise, by filling the soft belly section 13 with a scented material, the fish gets a sudden release when biting the lure. This triggers the swallow reflex of the fish and causes the fish to fully take the lure 10.

Although a variety of scented material can be used in conjunction with the present invention fishing lure, a preferred scented foam composition is disclosed in now abandoned U.S. patent application Ser. No. 12/201,523, entitled Scented Plastic Foam For Use With Artificial Bait, which shares the same inventors as this invention. The disclosure of this co-pending, application is therefore incorporated into this specification by reference.

The body 12 of the fishing lure 10 defines a watertight internal compartment 16. Inside the internal compartment 16 are contained electronics 20. As will be later explained, the electronics 20 provide visual and audio characteristics to the fishing lure 10.

The fishing lure 10 is generally fish shaped, having a front end 22, a rear end 24 and side flank surfaces 26 that run between the front end 22 and the rear end 24. The bumps 21 and depressions 23 may be formed on the exterior of the lure 10 to help the lure reflect light in varied patterns. A loop connector 28 is provided at the front end 24 of the fishing lure 10, so that the fishing lure 10 can be secured to a fishing line. Hooks 30 are affixed to the fishing lure 10 so that the fishing lure 10 is capable of catching a fish that bites the fishing lure 10. The number, location and types of hooks used can vary greatly and is a matter of design choice for the lure manufacturer.

Light ports 32 are present in the flank surfaces 26 of the fishing lure 10. In the shown embodiment, three light ports 32 are shown. This number is exemplary and it will be understood that any plurality of light ports 32 can be present. As will later be explained, controlled pulses of light are emitted into the water surrounding the fishing lure 10 as the lure 10 is pulled through the water.

At least one light sensor 34 is provided as part of the fishing lure 10. The light sensor 34 is located on one or both of the side flank surfaces 26. It will therefore be understood that the light sensor 34 detects the ambient light present at the side of the fishing lure 10 as the fishing lure 10 is pulled through the water.

Figure 2:
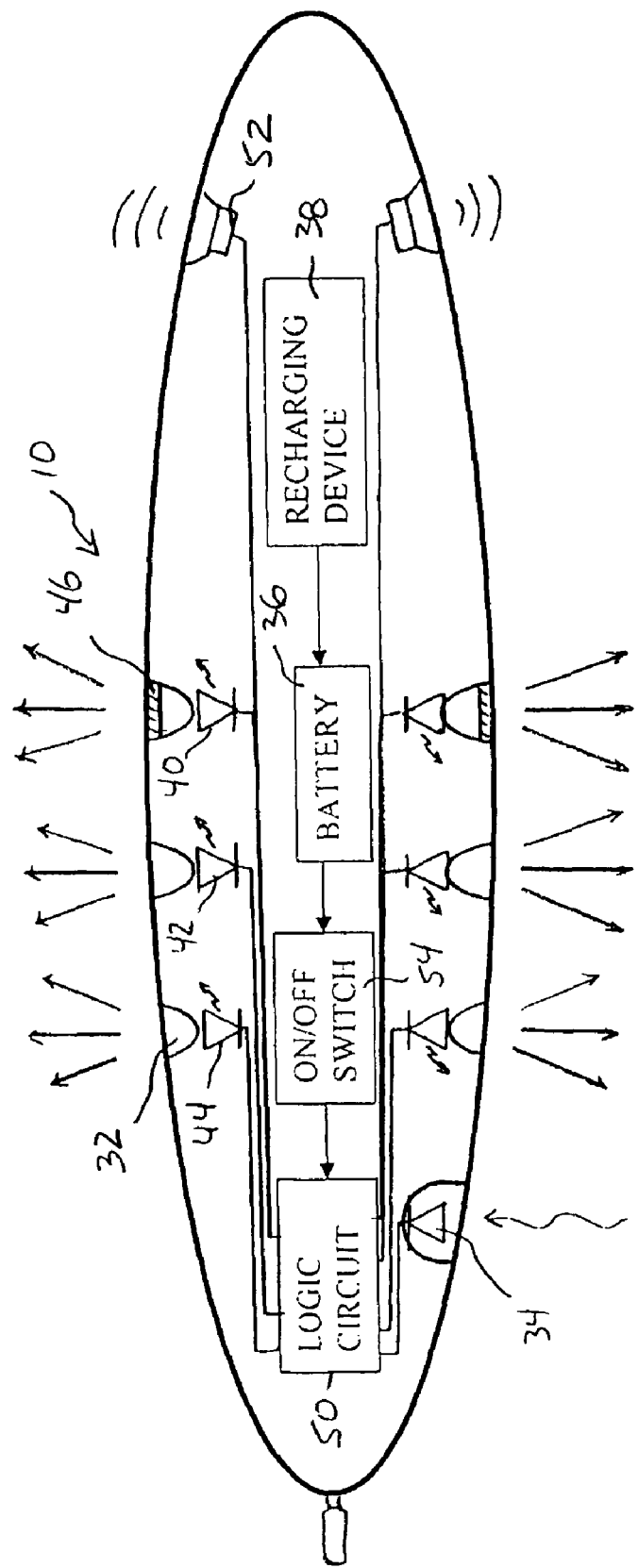
FIG. 2 is a schematic of the exemplary embodiment of the fishing lure showing the electronic components contained within the fishing lure.

Referring to FIG. 2, in conjunction with FIG. 1, it can be seen that inside the fishing lure 10, the electronics 20 include a battery 36. An optional motion-powered recharging device 38 may be provided for recharging the battery 36. The recharging device 38 is any device that converts mechanical movement into electrical current. Many motion powered recharging systems are used to recharge batteries in wristwatches and similar electronic devices. Any such prior art motion-powered recharging device can be adapted for use by the present invention fishing lure 10, wherein the recharging device 38 is activated by the movement of the fishing lure 10 through the water.

A plurality of light emitting diodes (LEDs) are present inside the fishing lure 10. Each of the LEDs is preferably monochromatic, wherein the plurality of LEDs contains LEDs of different light frequency outputs. In a preferred embodiment, the fishing lure contains red LEDs 44, green LEDs 42 and ultraviolet LEDs 40. The light from the LEDs 40, 42, 44 exits the fishing lure 10 through the light ports 32 on the side flank surfaces 26. The light ports 32 are positioned in a horizontal plane. It will therefore be understood that when any of the LEDs 40, 42, 44 is activated while the fishing lure 10 is underwater, the light generated will travel out from the lure 10 primarily in the horizontal plane. This is a plane parallel to the surface of the water. The light will therefore be most viewable when viewing the fishing lure 10 from the side.

The light ports 32 are configured to confine the output beam of the various LEDs 40, 42, 44. The light ports 32 are shaped to permit a beam spread angle of under twenty degrees to emanate from each light port 32. The beam spread angle for the preferred embodiment is approximately ten degrees. Furthermore, a polarizing filter 46 may be placed in the light port 32 in front of any of the LEDs 40, 42, 44. The polarizing filter 46 polarizes the light emitted by an LED. In the shown embodiment, a polarizing filter 46 is placed in front of the ultraviolet LEDs 40.

The red LEDs 44, green LEDs 42 and ultraviolet LEDs 40 are all controlled by logic circuitry 50. The logic circuitry 50 activates the various LEDs 40, 42, 44 in a variety of sequences. It is preferred that the logic circuitry 50 activate the various LEDs 40, 42, 44 in a random or quasi-random fashion. Each of the LEDs 40, 42, 44 is independently activated for a short flash. The duration of each flash is preferably between 0.05 seconds and 1 second. Likewise, there is a waiting period between flash activations. This waiting period is preferably between five seconds and twenty seconds, but can be longer. The waiting period is preferably randomly selected from this range. However, a quasi-random sequence, such as a 5-10-5-15-5-20 second pattern can be used as an alternative to true randomization. What is important is that the flashes of the various LEDs 40, 42, 44 appear to a predator fish to be random. During the waiting period other electronic functions may operate, as will be explained. By alternating different functions, the power requirements of the electronics 20 can be kept within the capacity of small batteries.

In addition to varying the duration of the flashes and the duration of the waiting period between flashes, the logic circuitry 50 also varies the LEDs used in each flash. The various LEDs flash individually. Consequently, the light frequency characteristics of each flash also appear to be random to a predator fish.

By flashing different colored LEDs 40, 42, 44 in apparent random patterns and for apparent random durations, the fishing lure 10 will produce flashes of light underwater that more closely simulate a real baitfish. The realism of the optical characteristics is further increased by the limited beam spread of the flashes and the polarization used on the flashed light. Furthermore, by using red LEDs 44, green LEDs 42 and ultraviolet LEDs 40, the actual frequencies of light contained in the flashes closely simulates the flashes of light reflected from the scales of a live baitfish.

It is known that if a flash from a lure is too bright in relation to the ambient light, the flash will actually startle away fish rather than attract fish. Furthermore, if the intensity of a flash is too low, as compared to ambient light, the flash may not be noticed. As previously mentioned, the present invention contains a light sensor 34. The light sensor 34 detects the ambient light present at the side of the fishing lure 10, not above or below the fishing lure. The degree of ambient light at the side of the fishing lure 10 depends upon the amount of ambient light present above the water, the clarity of the water and the depth of the lure 10.

The light sensor 34 is coupled to the logic circuitry 50. The logic circuitry 50 controls the light intensity contained within the flashes of the red LEDs 44, green LEDs 42 and/or ultraviolet LEDs 40. It is preferred that the logic circuitry 50 control the intensity of any one flash so that the flash intensity is between five and ten times the intensity of the ambient light detected by the light sensor 34. In the preferred embodiment, the light intensity of any one flash would be approximately 7.5 times the intensity of the detected ambient light. A flash at this intensity is bright enough to be seen but not too bright so as to scare away fish. By actively controlling the intensity of the flashes, the desired intensity multiple can be maintained even as the fishing lure passes into shaded areas, waters of different depths and waters of different clarity.

It will be understood that light sources other than LEDs can be used. The lure 10 may contain electro-chromatic material that produces light when powered. Alternatively, the lure may contain a solid-state laser and waveguides that guide the laser light to different openings on the lure. LEDs are illustrated to represent a cost efficient manner of producing the invention.

A transducer 52 is optionally contained within the fishing lure 10. The transducer 52 is used to create acoustic particle motion through the water. The acoustic particle motion is intended to mimic that produced by a real baitfish, especially an injured baitfish. Different types of fish create different types of acoustical particle motion and pressure waves. The transducer 52 is controlled by the logic circuitry 50. The logic circuitry 50 causes the transducer 52 to operate at different frequencies at various times. The amount of time that the transducer 52 is activated, the amount of lapse time between activations and the frequencies of the signals are preferably random or pseudo-random within predetermined acceptable ranges.

The present invention fishing lure 10 contains electronics 20 that enhance the attractiveness of the fishing lure 10 to fish. For many reasons, it is desirable to have the electronics 20 only activate when the lure 10 is used for fishing in the water. For this reason, the fish lure 10 is provided with an on/off switch 54. The on/off switch 54 may be a traditional manually operated switch. However, the on/off switch 54 is preferably a water activated switch that activates the electronics 20 in the fishing lure 10 only when the lure 10 is submerged in water. There are many known water activated switches. Many of these prior art switches can be adapted for use within the present invention. Alternatively, the on/off switch 54 can be a pressure switch. As the fishing lure 10 is pulled through the water, a significant degree of water pressure develops at the front of the lure 10. A pressure switch can detect this pressure and activate the electronics 20 within the lure 10.

In utilizing the present invention fishing lure 10, it will be understood that once the lure 10 is tied to a fishing pole and cast into water, the electronics 20 within the fishing lure 10 will activate. The lure 10 will flash underwater from time to time. The flashes will vary in duration and light frequencies. Furthermore, the flashes will be confined to narrow beams and may contain polarized light.

Additionally, the intensity of the flashes will be actively controlled as a function of ambient conditions. In this manner, the flashes will be neither too dull nor too bright. Accordingly, the light flashes generated by the fishing lure 10 will emulate the scale flashes of a live baitfish in an accurate manner.

In addition to providing realistic flashes, the fishing lure 10 may generate pressure waves that simulate those produced by real baitfish. Furthermore, the fishing lure 10 may emit scent underwater and has a softened exterior that prevents a fish from rejecting the lure 10 at mid-bite. By providing a fishing lure 10 that has improved, visual, acoustical, olfactory and tactile characteristics, a more effective fishing lure 10 is provided.

It will be understood that the embodiment of the present invention that is illustrated and described is merely exemplary. Accordingly, a person skilled in the art can vary the exemplary embodiment in many ways. For instance, the shape of the lure body, the contours of the lure body and the color scheme of the lure body are all a matter of design choice. Likewise, the number and location of hooks is a matter of design choice. Other light sources can be substituted for the described LEDs. Furthermore, the number of LEDs present in the lure can be altered as the size of the lure is altered. All such variations, modifications and alternate embodiments are intended to be included within the scope of the present invention as defined by the claims.

What is claimed is:

1. A fishing lure, comprising:
   a body having external flank surfaces;
   a plurality of light sources, each of which light sources are monochromatic and wherein at least one of said plurality of light sources is of a first wavelength and wherein at least a second of said plurality of light sources is of a second wavelength, and wherein said plurality of light sources shine light out from said flank surfaces when activated; and
   a light sensor for detecting ambient light levels external to said body;
   wherein said plurality of light sources each have an output intensity that varies as a function of said ambient light levels detected by said sensor, said fishing lure further including circuitry within said body for selectively flashing said plurality of light sources in a flash pattern at predetermined activation intervals, wherein said flash pattern includes random flashing of said plurality of light sources between said at least one of said plurality of light sources of said first wavelength and at least said second of said plurality of light sources of said second wavelength.

2. The lure according to claim 1, wherein said plurality of light sources includes an ultraviolet light source and at least one visible light source.

3. The lure according to claim 2, wherein said at least one visible light source includes a red light source and a green light source.

4. The lure according to claim 1, wherein said predetermined activation intervals randomly vary.

5. The lure according to claim 1, further including a polarizing filter for filtering light emitted by at least one of said light sources.

6. The lure according to claim 1, wherein light emitted by each of said light sources is confined to a beam spread angle of less than twenty degrees.

7. The lure according to claim 1, wherein said light sources emit light in a horizontal plane when said lure is under water.

8. The lure according to claim 1, wherein said light sensor is disposed on one of said flank surfaces of said body and detects ambient light impinging upon said flank surfaces.

9. The lure according to claim 1, further including an on/off switch for selectively activating said circuitry.

10. The lure according to claim 9, wherein said on/off switch is automatically turned to an on condition when said lure is submersed in water.

11. The lure according to claim 1, further including a transducer for producing sound pressure waves.

* * * * *